United States Patent [19]

Smith et al.

[11] 4,386,379
[45] May 31, 1983

[54] VIDEOTAPE CUE CONTROL AND DISPLAY APPARATUS

[75] Inventors: Grant M. Smith, Menlo Park; Vinson R. Perry, San Carlos; Bruce E. Busby, Mountain View, all of Calif.

[73] Assignee: Sony Corporation, Japan

[21] Appl. No.: 195,824

[22] Filed: Oct. 10, 1980

[51] Int. Cl.³ .................. G11B 15/18; G11B 19/02
[52] U.S. Cl. ............................ 360/72.3; 360/49; 360/744
[58] Field of Search ............ 360/72.3, 72.2, 74.4, 360/71, 12-14, 49, 72.1

[56] References Cited

U.S. PATENT DOCUMENTS

| 3,921,220 | 11/1975 | Primosch et al. | 360/72 |
| 3,949,420 | 4/1976 | Older | 360/72.3 |
| 4,210,785 | 7/1980 | Huber | 360/72.3 X |
| 4,210,940 | 7/1980 | Prysby et al. | 360/72.3 X |
| 4,267,564 | 5/1981 | Flores | 360/72.3 |
| 4,301,482 | 11/1981 | Trevithick | 360/72.2 X |

Primary Examiner—John H. Wolff
Attorney, Agent, or Firm—Philip M. Shaw, Jr.

[57] ABSTRACT

A controller for a video tape recorder (VTR) which allows a plurality of separate tape times to be cued at the selection of the operator by means of separate cue registers and corresponding cue switches operating in conjunction with a programmed controller and a tape time counter which is slaved to the VTR tape timer. The controller also causes the VTR to search for cued tape times as stored in selected ones of the cue registers and, at the option of the operator, to stop the tape at a tape time slightly prior to a selected one of the cued tape times. Digital, fine and coarse clock tape time displays are also provided for indicating the tape time, when the tape is moving, and selected cued tape times when the tape is stopped.

10 Claims, 17 Drawing Figures

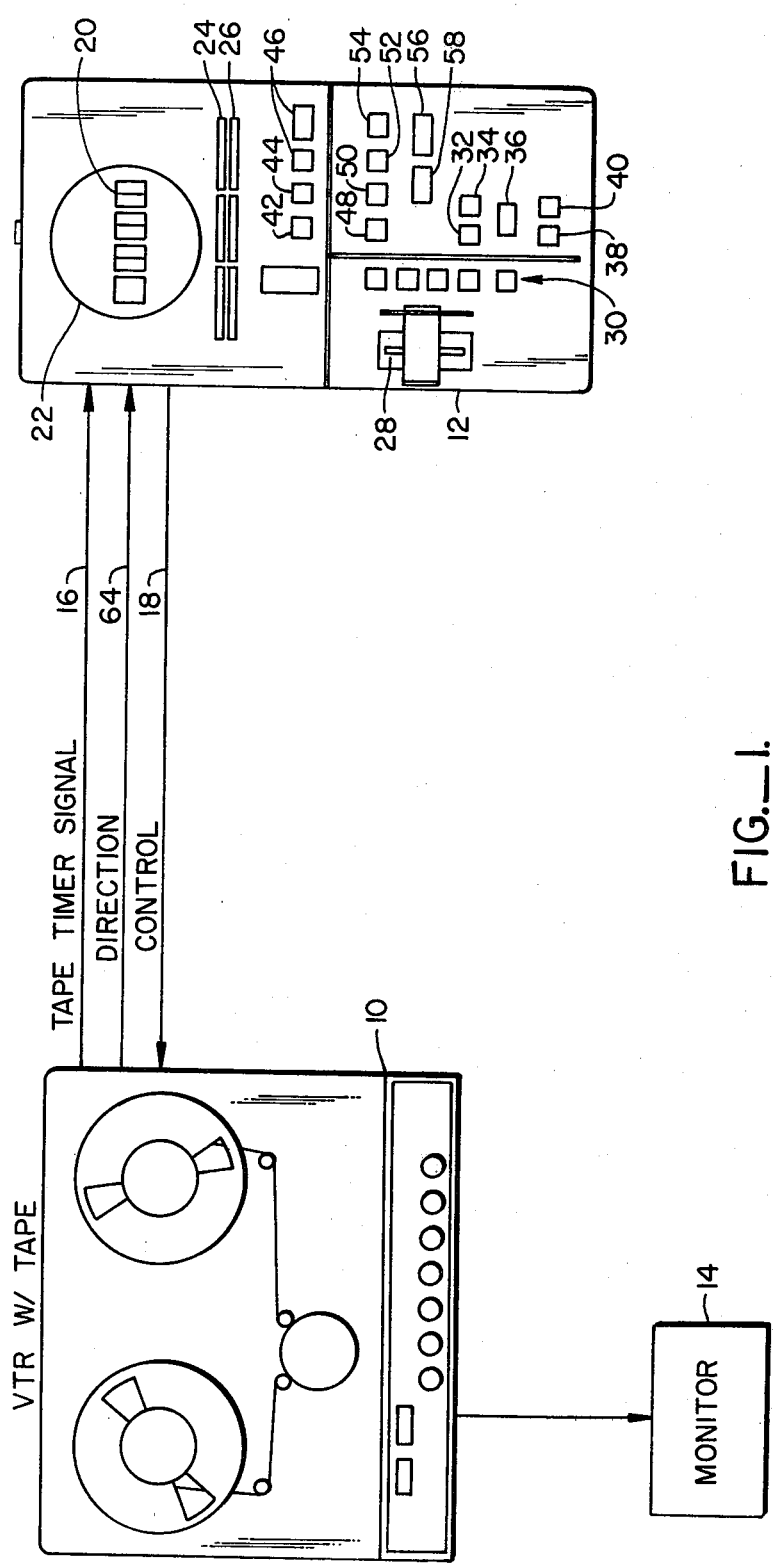
FIG.—1.

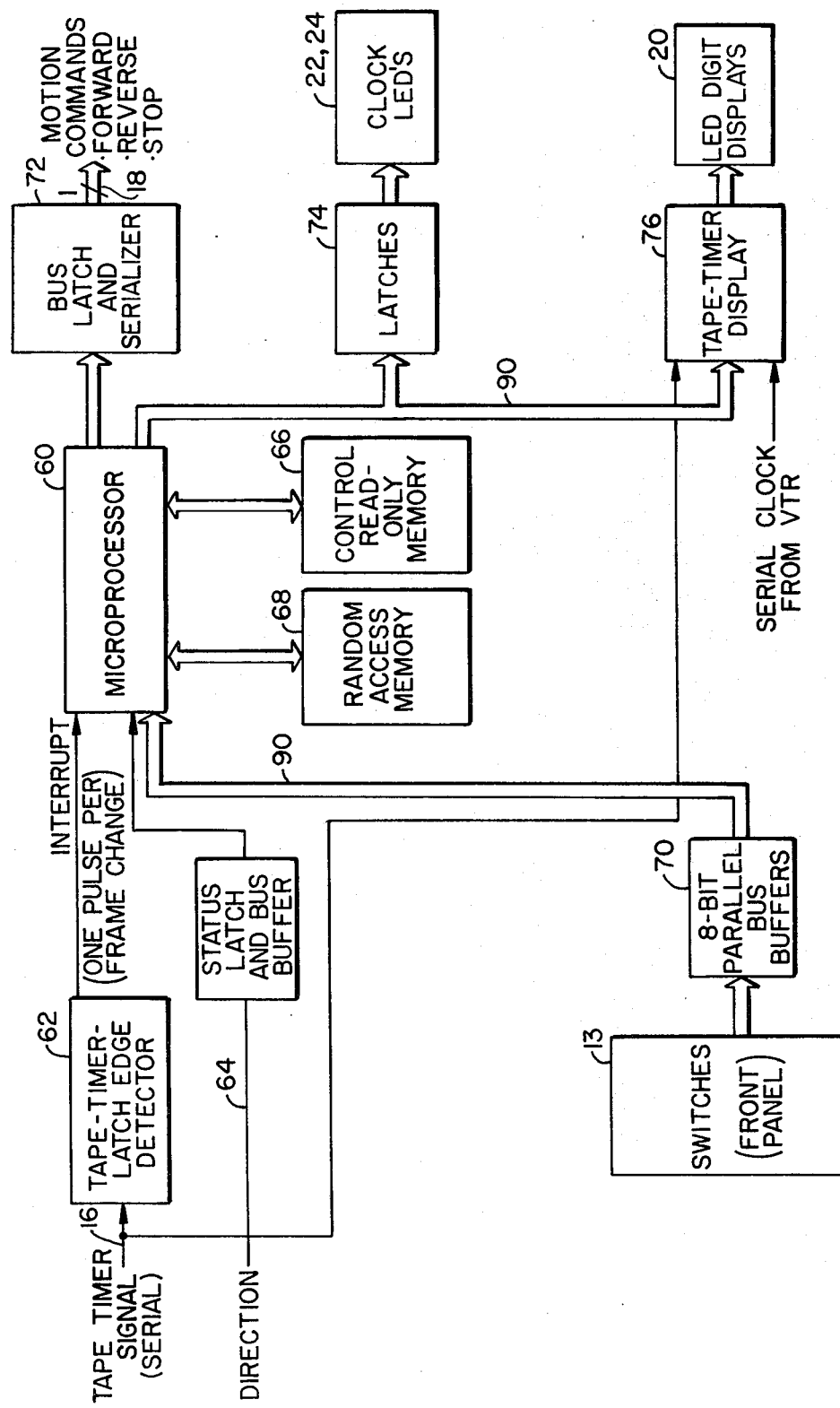
FIG._2.

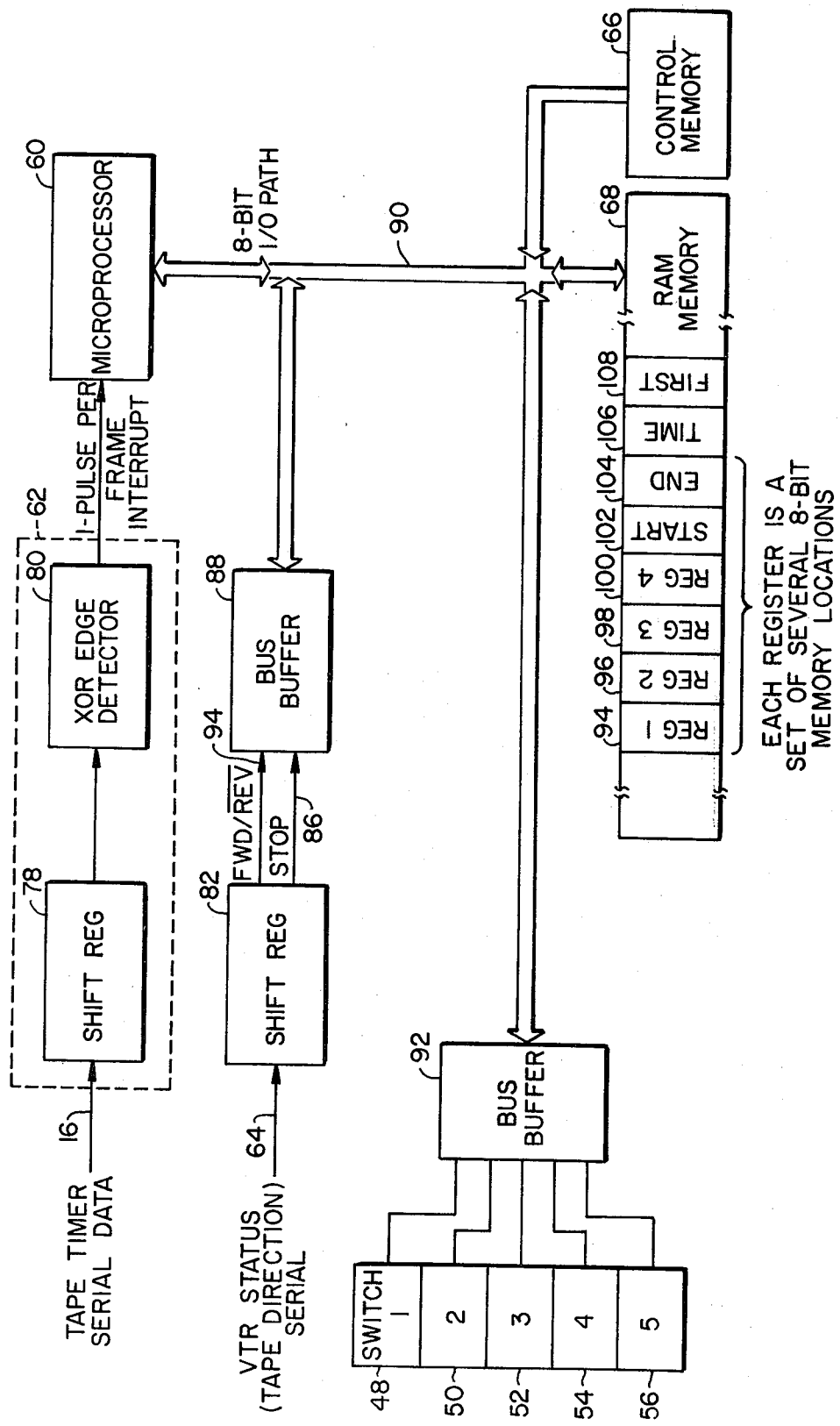
FIG._3.

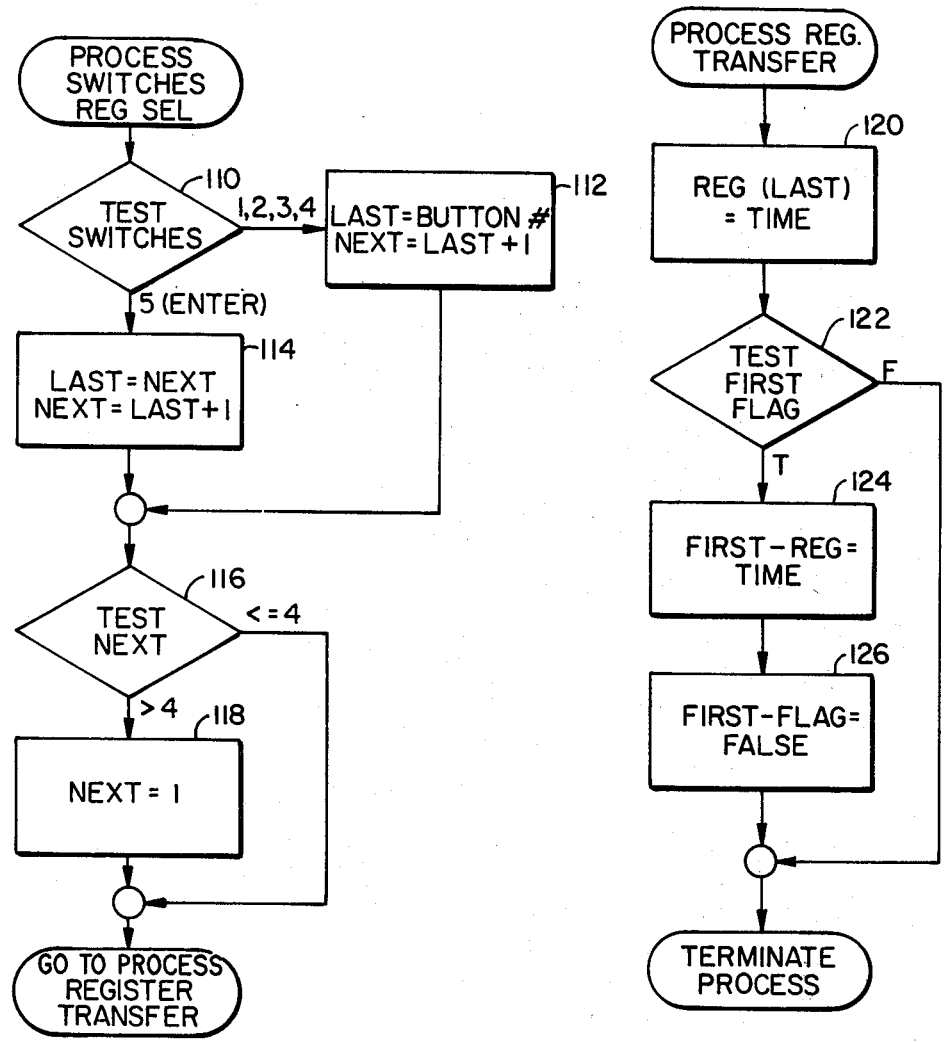

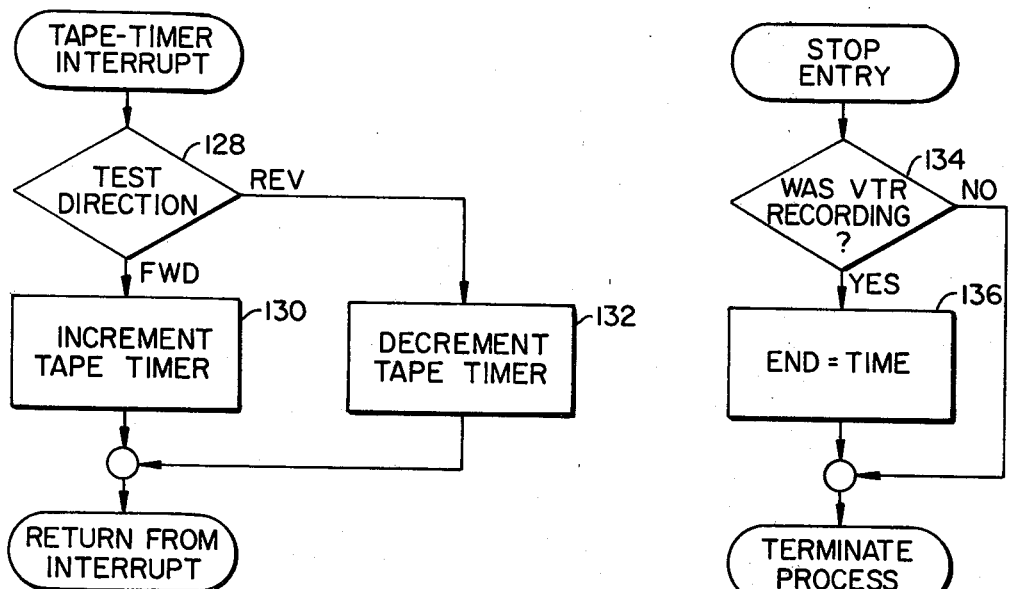
FIG._6.
FIG._7.
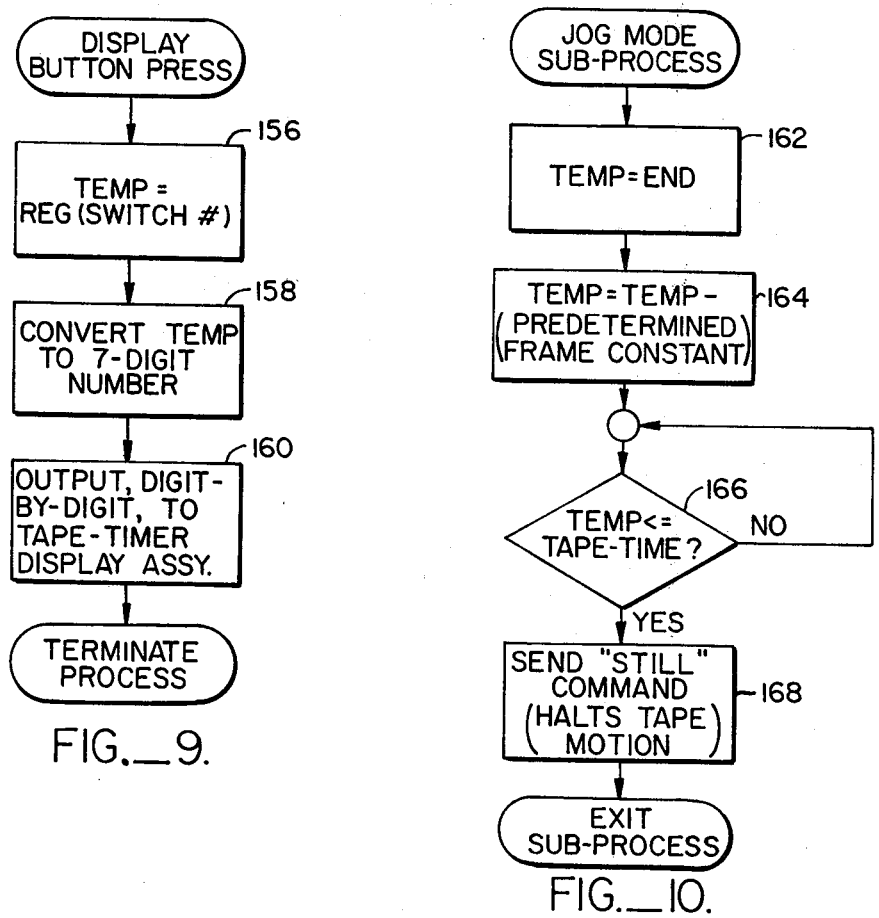
FIG._9.
FIG._10.

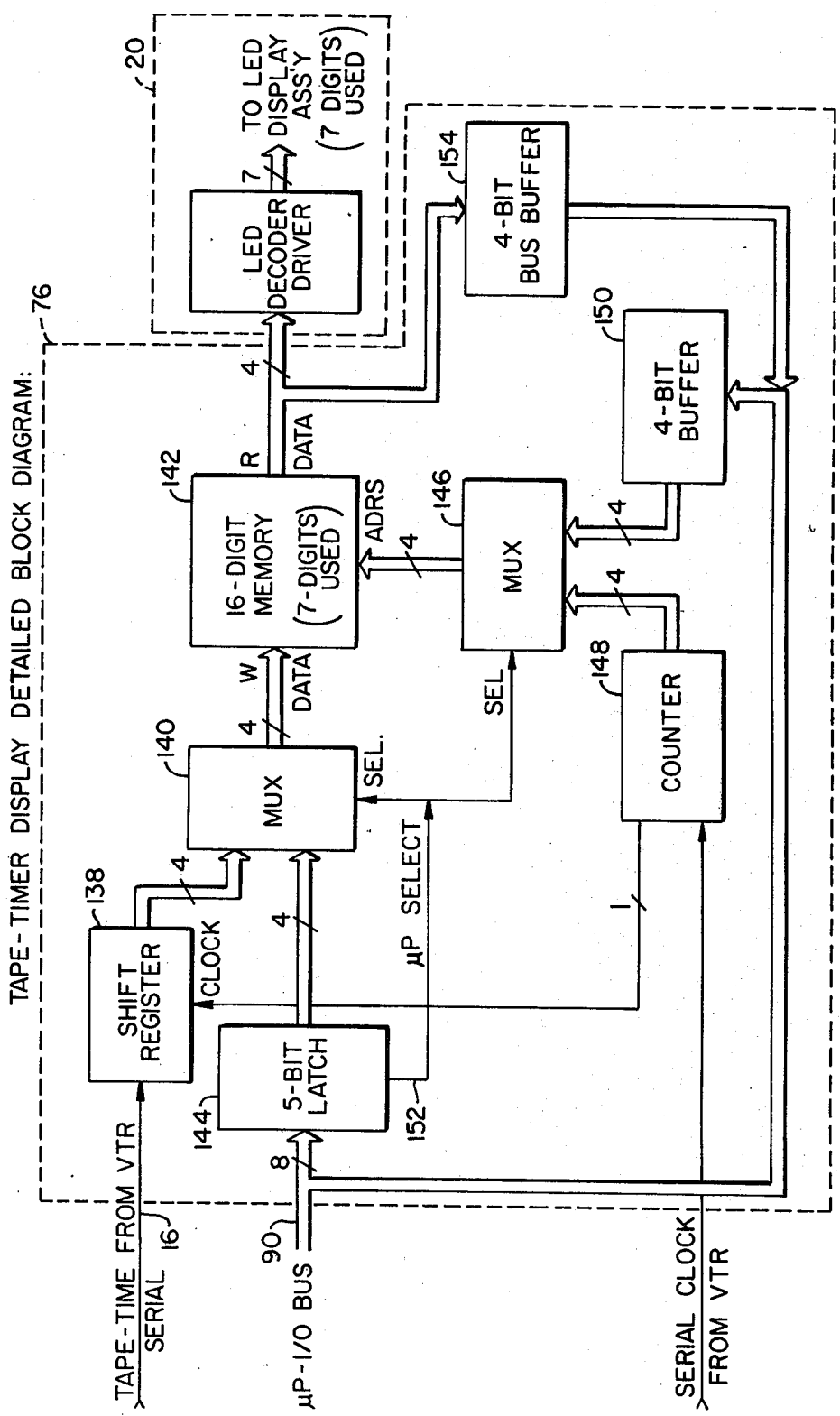
FIG._8.

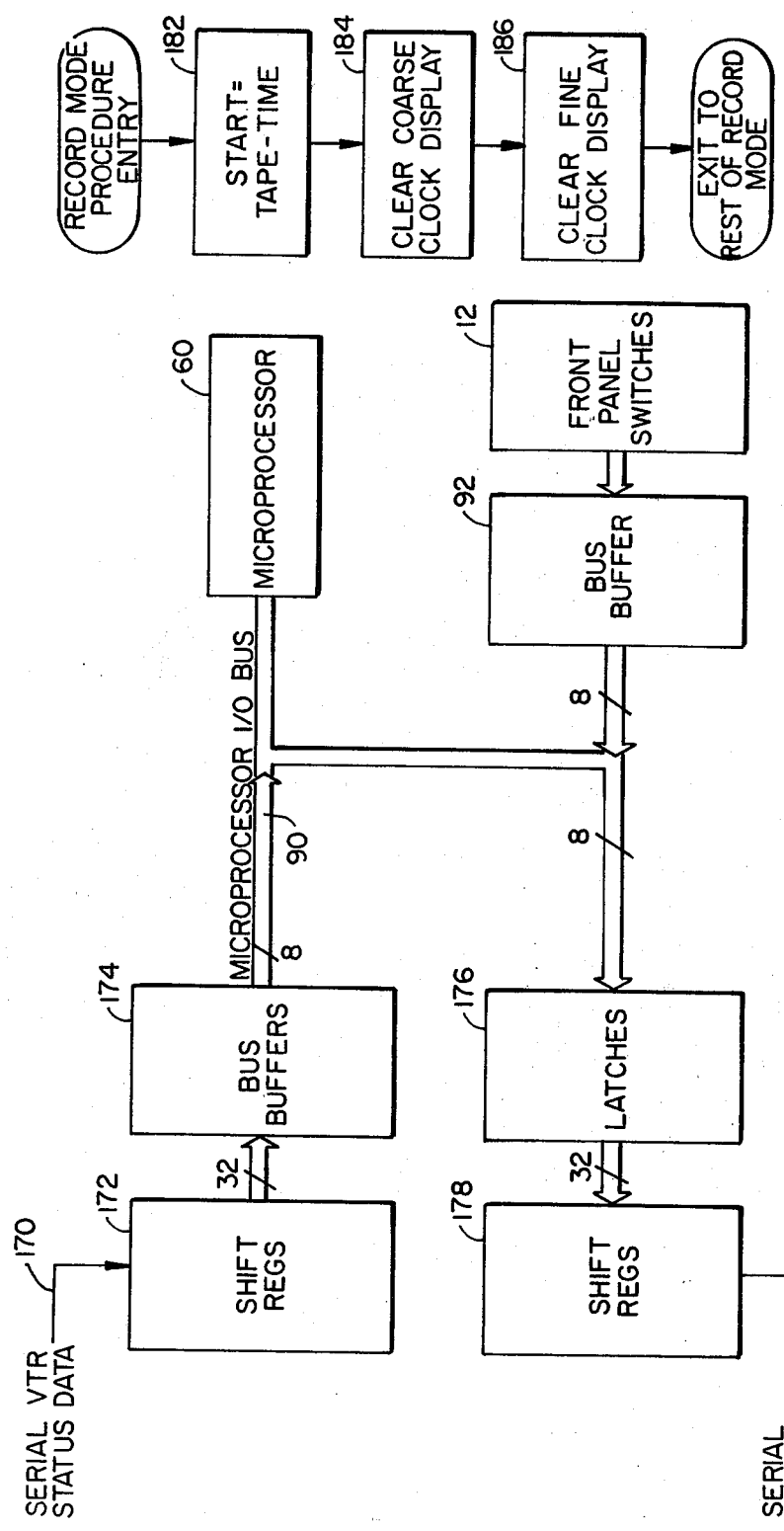

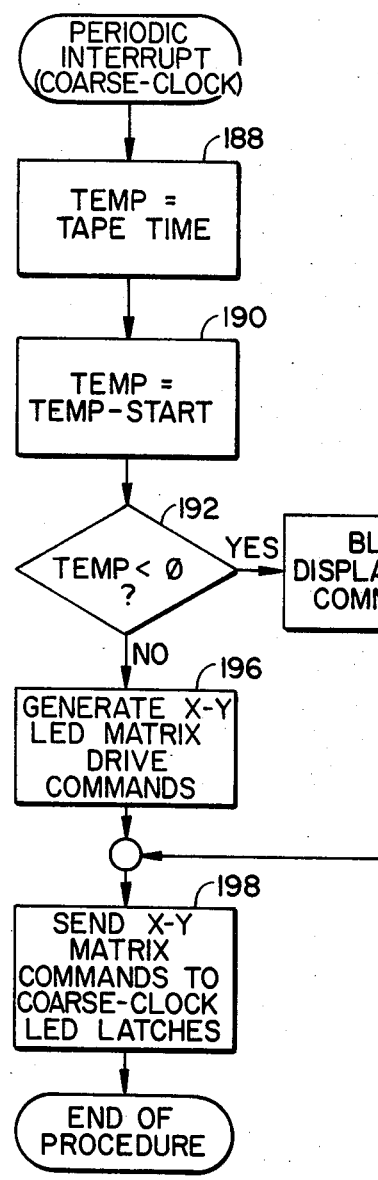
FIG.—13.
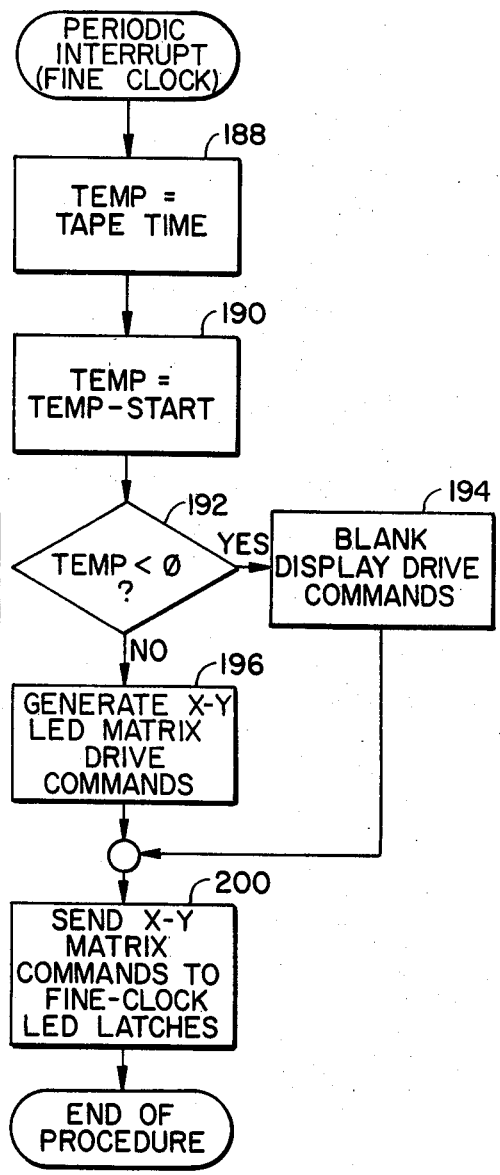
FIG.—14.

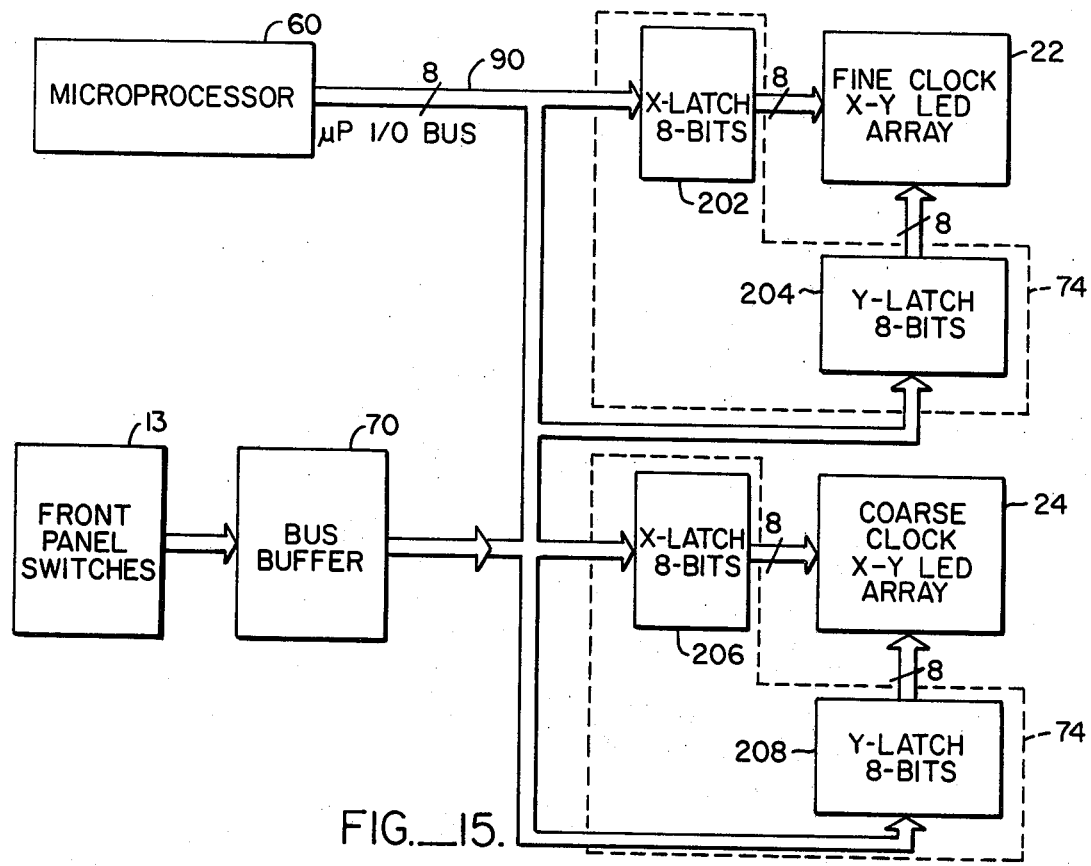
FIG._15.
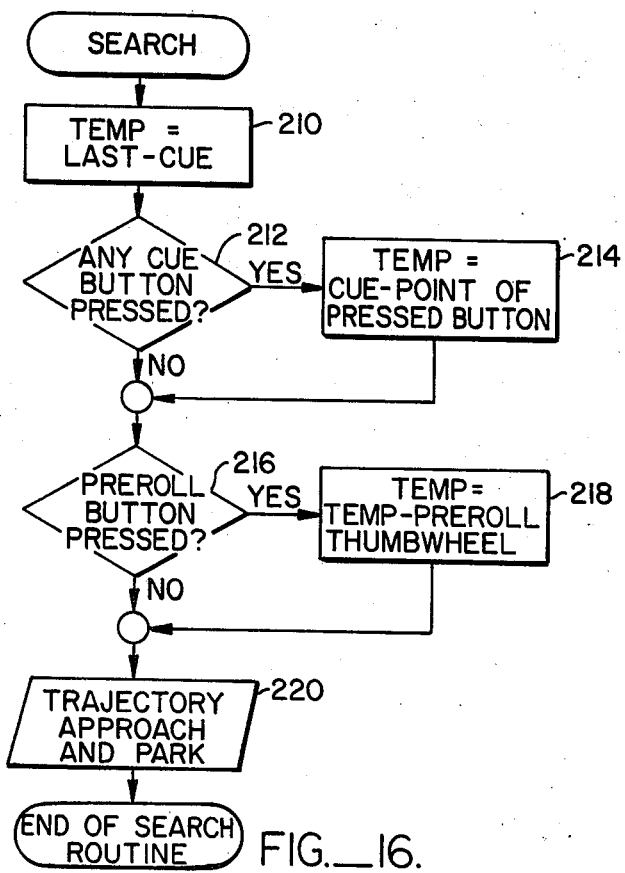
FIG._16.

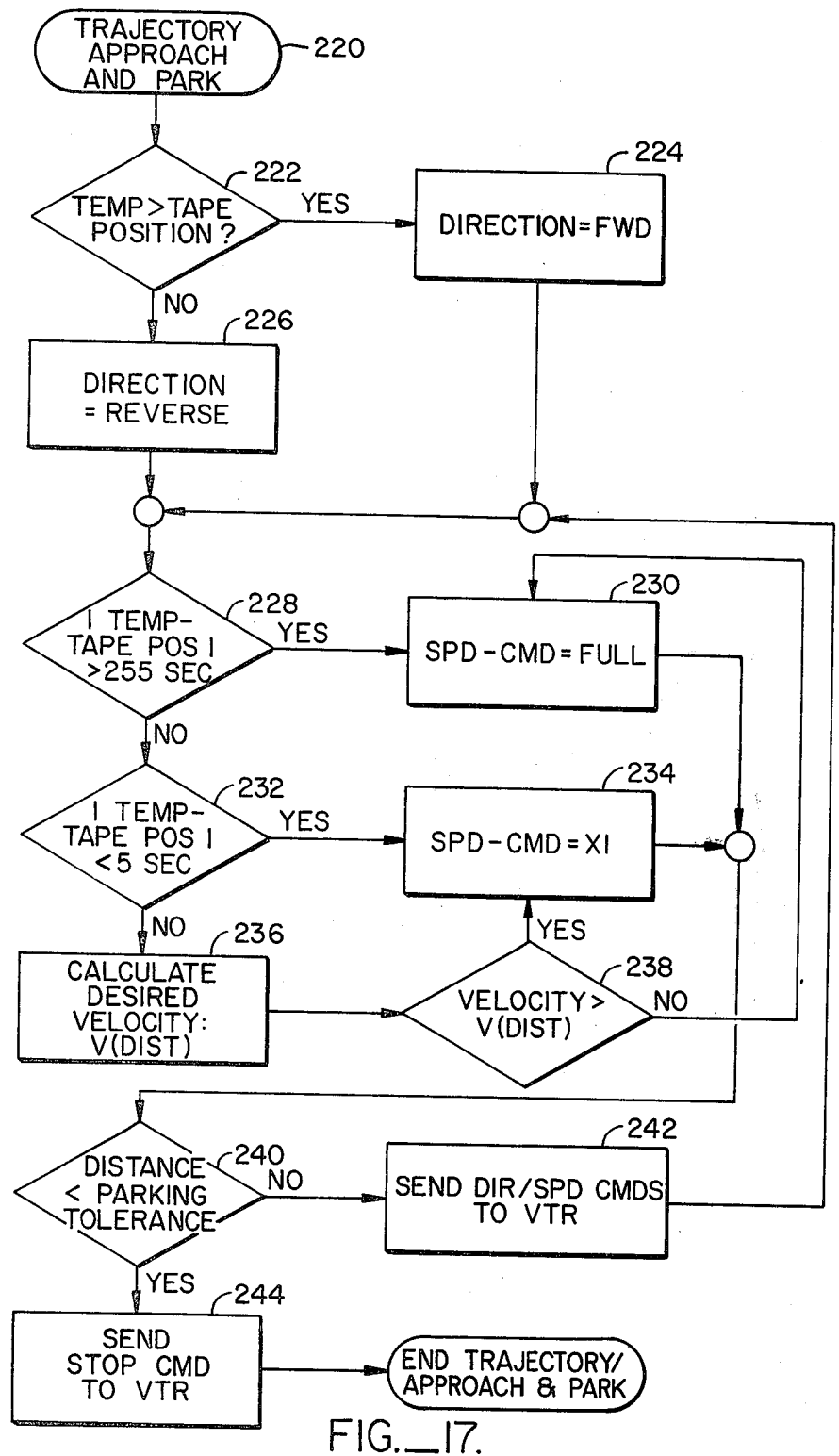
FIG._17.

VIDEOTAPE CUE CONTROL AND DISPLAY APPARATUS

BACKGROUND OF INVENTION

This invention relates to a controller for a video tape recorder (VTR) and more particularly to a dynamic motion controller used for tape editing and playback.

In the operation of broadcast-type VTRs, it is often desirable to be able to remotely control the VTR and more particularly to produce a number of special effects with the recorded program material, such as variable motion effects and post-production editing.

One attribute of such controllers which is desirable is the ability to electronically designate a cue corresponding to a particular frame recorded on the video tape and to selectively replay the cued frame or the frames following the cued frame. Prior art controllers have only a one cue capability. This is very limiting in that only one cue segment can be recalled and further that it does not allow both the beginning and the end of a given segment to be prespecified before reproduction of the recorded segment.

It is often desirable to have a visual display of the accumulated playing time after the designation of a given cue. This tells the operator how long the segment is that has been designated by the cue, and also allows the operator to re-cue the segment more accurately.

SUMMARY OF THE INVENTION

The above and other disadvantages of prior art VTR controllers are overcome and the above-mentioned desirable features are accomplished by the present invention of a tape cue control system in combination with a VTR of the type having a magnetic tape, means for recording and reproducing signals on the tape, tape drive means, and means for producing tape time signals corresponding to movement of the tape through a predetermined distance. The tape cue control system of the invention comprises a tape time counter supplied with the tape time signals from the VTR for counting said signals, and for producing a corresponding count output signal, a plurality of cue switches, a plurality of registers for storing count output signals supplied thereto, each of the registers corresponding to a separate one of the cue switches, means for supplying the count output signal to a separate one of the registers when each cue switch corresponding to said selected register is actuated during the movement of the tape, and means for controlling the tape drive means in accordance with a selected one of the tape time signals stored in one of the registers.

The cue control system of the preferred embodiment includes second switch means and means for selecting each of said registers consecutively and circularly for supplying a count output signal from the tape time counter whenever the second switch means are actuated during movement of the tape. With this second switch means, cues may be entered consecutively simply by pushing the second switch means whenever it is desired to enter a cue. After all of the registers have been filled, subsequent actuation of the second switch means will cause the contents of the first register to be written over with new data, and so forth, in the same sequence.

In the preferred embodiment the tape cue control system further comprises a second register for storing tape time signals supplied thereto and means for supplying an output signal from the tape time counter to the second register whenever the VTR stops recording. This allows the tape time of a particular cue to be displayed when the VTR is stopped. A display is provided for indicating either the tape time, when the tape is moving, or the cued tape time stored in a selected one of the cue registers, when the tape is stopped.

In some situations it is desired to control both the beginning and end of a given recorded tape sequence. In this mode, referred to hereinafter as the stunt-to-cue mode, the beginning and end of a given sequence are designated by appropriate cue switches. Shortly before the ending cue mark is reached, the VTR is automatically caused to stop, resulting in a still image.

In order to carry out this mode, the control system of the invention further comprises means supplied with the output signal from the tape time counter for generating and storing a stop tape time signal which is earlier than the tape time stored in the ending cue register by an amount representative of a predetermined number of video frames. The control system further includes means for comparing the tape time counter output signal with the stop tape time signal and for stopping the tape during reproduction when the output of the tape time counter equals the stop tape time signal.

In order that the operator can accurately determine the length of recorded segments between cues and to visually locate cues and the spacing between them, the control system of the invention further comprises coarse clock means having coarse time display means, fine clock means having fine time display means, and means for starting the coarse clock when the controller actuates the VTR to move the tape, means for starting the fine clock means when an output signal of the tape time counter is supplied to any one of the registers, and means for stopping both the coarse and fine clock means when the controller causes the VTR to stop tape motion.

It is therefore an object of the present invention to provide a motion controller for a VTR which allows a plurality of distinct cue (tape time) addresses to be entered or dropped in one entire sequence.

It is another object of the invention to provide a controller for a VTR in which a plurality of cue addresses can be automatically searched, one at a time, and the tape caused to be moved to a predetermined point corresponding to the cue address.

It is still another object of the invention to provide means for sequentially marking or dropping cues in a controller for a video tape recorder.

It is yet another object of the invention to provide a VTR controller which allows cuing of both the beginning and the ending of a given sequence recorded on the video tape, with the VTR being caused to still on a frame shortly before the ending cue of the sequence.

It is yet a further object of the invention to provide a VTR controller which has a tape time display slaved to the VTR tape timer, a coarse clock for both the tape time and cue locations, and a vernier clock for indicting cue points and the spacing between cue points to a predetermined resolution.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram illustrating the dynamic motion controller of the invention in conjunction with a VTR and monitor;

FIG. 2 is a block diagram for use in explaining the operation of the dynamic motion controller of the invention;

FIG. 3 is a more detailed block diagram of a portion of the system depicted in FIG. 2;

FIG. 4 is a flow chart depicting the operation of the controller of the invention during the selection of a cue;

FIG. 5 is a flow chart depicting the storage of cue data after the cue has been selected;

FIG. 6 is a flow chart depicting the updating of an internal tape timer within the controller to correspond to the tape timer within the VTR;

FIG. 7 is a flow chart depicting the transfer of the data from a register when the VTR stops recording;

FIG. 8 is a block diagram of the digital hardware making up the tape timer display of the invention;

FIG. 9 is a flow chart of the output signal generator from registers within the controller to the tape timer display;

FIG. 10 is a flow chart depicting calculation of stop time and tape stop commands;

FIG. 11 is a more detailed block diagram of the interfacing for control purposes between the controller and the VTR;

FIG. 12 is a flow chart depicting fine and coarse clock initialization;

FIG. 13 is a flow chart depicting the generation of a digital tape time display;

FIG. 14 is a flow chart describing the updating of the fine clock display; and

FIG. 15 is a block diagram of the circuitry for driving the digital display of the controller.

FIGS. 16 and 17 are flow charts illustrating the routine followed by the controller of the invention in controlling the videotape recorder tape handling apparatus while searching for a selected cue.

DETAILED DESCRIPTION OF THE PREFERRED EMBODIMENT

Referring now more particularly to FIG. 1, a VTR 10 is illustrated which may be of the high-band, dynamic tracking tape such as that manufactured by Sony Corporation, Model BVH-1100. Such a VTR, as is well known to those skilled in the art, has a magnetic tape for recording video and audio signals on the tape and for reproducing those signals from the tape and includes means of driving the tape as well as means for producing tape time signals corresponding to movement of the tape through predetermined distances. These tape time signals represent the location of particular video frames as recorded on the tape. Knowing a particular tape time signal allows the operator of the VTR to drive the tape until that portion of the tape containing a frame corresponding to that tape time signal is in position to be reproduced as indicated by the tape time displayed at the VTR.

Also depicted in FIG. 1 is a dynamic motion controller 12 according to the invention which is supplied with tape time signals as represented by the line 16 from the VTR and which generates VTR control signals as represented by the line 18 to the VTR.

The video signals which are reproduced by the VTR are displayed on a television monitor 14 which is connected to the VTR in the usual fashion.

As will be explained in greater detail hereinafter, the purpose of the controller 12 is to allow the production of high resolution, variable motion effects used in recording and reproducing sports events and in video post-production work. The controller 12 is self-contained within an operating console, includes its own power supply, and allows remote operation up to 200 meters from the VTR 10. The controller 12 is electronically connected by means of a cable (not shown) to the VTR 10. Up to four distinct cues (tape time) addresses can be entered or "dropped" into a memory contained within the motion controller in one entire tape sequence. All entered cue addresses can be automatically searched in a search mode. In this search mode, the VTR is directed to transport the tape until the selected cue address is found.

As will be described in greater detail hereinafter, for timing different length intervals, three distinct, yet complementary, timing displays are used. The system also allows for continuously variable motion as well as various fixed speed playback modes, which are not considered to be part of this application and will not be described in greater detail. As is shown on the face of the motion controller, it is provided with a digital tape display 20, a 60-second fine clock display 22 in the form of a circle of spaced-apart light emitting diodes (LEDs), and a coarse clock, three-minute display 24 in the form of a series of LEDs arranged in three, spaced-apart linear segments of twelve diodes, with each diode representing five seconds of time. A second coarse clock display 26 is arranged immediately adjacent the display 24, and in the same format, for displaying cue time in three, one-minute segments, of twelve five second indicators.

The controller is also provided with a number of control switches 13. The first of these is a variable speed joy-stick 28 which allows the tape motion to be varied from two times normal forward speed, to normal forward speed, to be stilled, that is stopped, and to be reversed at up to one-fifth normal speed. Additionally, a series of play buttons 30 are provided which allow the selection of normal (N) playing speed, half-normal (N/2) playing speed, a fifth normal (N/5) playing speed, stop tape, and variable speed under the control of the joy-stick 28. Play and record buttons 32 and 34, as well as the stop button 36, correspond to the same controls on the VTR and allow the same control functions to be operated remotely.

Also provided on the face of the controller is a power on/off switch 42, a stunt-to-cue switch 44, a pre-roll switch 45 and pre-roll time selector 46. In order to enter the cues into the controller, a series of cue buttons 48, 50, 52 and 54 are provided on the face of the controller. Two further switches are also provided, an enter button 56 and a search button 58. These switches relate to cuing of the tape.

In operation, cues may be entered into the controller in one of two ways. Either one of the cue buttons 48, 50, 52 or 54 can be pressed, in which case the current tape time signal corresponding to the video frame being displayed will be stored in a register within the controller or the enter button 56 can be pressed in which case the same thing will happen. The difference between pressing the particular one of the cue buttons 48–54 or the enter button 56 is that pressing the enter button causes the cues to be stored in sequence in registers corresponding to the cue buttons 48, 50, 52 and 54 in that order. Thus if no cues had previously been stored, pressing the enter button will store a cue in the register corresponding to cue button 48. Pressing the enter button again will store the second cue in the register corresponding to cue button 50, and so forth, with the sequence recycling after the register corresponding to the cue button 54 is provided with cue data. To recall a particular video frame for reproduction, the search button 58 is pressed. This causes the VTR to search to and park on the last cue entered. If the search button is pressed and within one second a specific cue button 48–54 is pressed, the VTR will search directly to that specific cue number. The cue entering and cue searching operation will be described in greater detail hereinafter.

Referring now more particularly to FIG. 2, the controller 12 is comprised of a number of elements. Primary to all of these elements is a microprocessor 60. The tape timer signal 16 from the VTR is supplied to the tape timer latch 62. The tape timer signal is generated in the VTR and is a serial signal that contains seven digits of tape time encoded in it which include (units) hour, tens of minutes, minutes, tens of seconds, seconds, tens of frames and frames. This tape time is synchronized with the beginning of the tape so that any particular tape time corresponds to a specific video frame recorded on the tape. Reverse winding the tape will cause a decrease in the various counts of the tape time signal and correspondingly running the tape in the forward direction will cause the tape time signal to increase in the various numbers.

The tape timer latch 62 accepts the tape timer signal in serial form and puts it into a latched, parallel representation of that data. The tape timer latch 62 is a serial-to-parallel converter. The output of the tape timer latch is a pulse for every unit frame change. The latch 62 looks at the units, frames, digits, and least significant bit and when these change, it generates a pulse. This pulse is supplied to the interrupt line of the microprocessor 60. Also supplied to the microprocessor from the VTR is a direction signal 64. This is in the form of a bit which is read by the microprocessor. By means of the pulse per unit frame and the direction bit, the microprocessor is able to increment or decrement an internal counter whose count will correspond exactly to the VTR tape timer counter. In performing this and other functions, the microprocessor processor 60 has access to a control, read-only memory (ROM) 66 and to a random-access memory (RAM) 68. The ROM 66 contains the control program for the microprocessor and the RAM 68 is for reading or writing temporary variables, such as the cue registers.

The microprocessor 60 is connected to the front panel control switches 13 through a group of eight-bit parallel buffers 70.

The output of the microprocessor goes to a bus latch and serializer 72 where data in parallel form is converted to serial form to provide motion commands 18 to the VTR. These motion commands can be in the form of tape direction signals such as forward, reverse and stop signals, for example. An output from the microprocessor is also supplied to a series of latches 74 which control the fine and coarse clock displays 22 and 24. The same output from the microprocessor is also supplied to a tape timer display circuit 76 for driving the digital display 20. The VTR tape timer signal 16 is also supplied as an input to the tape timer display 76. The display 20 displays the tape time of the video frame which is being reproduced or recorded at all times except when the VTR is in the stop mode and one of the cue switches is pressed. Then it displays the tape time stored in the register corresponding to the particular cue switch which was actuated. The display 20 is in the form of a group of seven-segment LED displays on the front panel of the motion controller.

FIG. 3 shows in greater detail the way in which the tape timer serial data is stored in the shift registers during the cuing function. The tape timer serial data 16 is supplied to the input of the shift register 78 whose output is supplied to an exclusive OR edge detector 80. Together the shift register 78 and the exclusive OR edge detector 80 constitute the tape time latch 62 which functions as a serial-to-parallel converter for producing the one-pulse-per-frame output to the interrupt line of the microprocessor 60.

The tape direction signal 64, in serial form, is supplied to a second shift register 82 which provides two outputs to a bus buffer 88. The output 84 of the shift register contains forward or reverse signal information. The signal output 86 from the shift register provides stop signal information. The bus buffer 88 interfaces the shift register 82 to the microprocessor 60 through an eight-bit input/output (I/O) bus 90. The cue switches 48, 50, 52 and 54 and the enter switch 56 are all interfaced to the microprocessor 60 through a bus buffer 92 connected to the I/O path 90. The control memory 66 and the RAM 68 are also connected through the I/O path 90 to the microprocessor 60.

The allocation of random-access storage for registers in the RAM 68 is depicted in FIG. 3. Within the RAM 68 is a contiguous block of separate eight-bit memory locations constituting a series of cue registers 94, 96, 98, 100, 102 and 104. Additionally, memory space is provided for the TIME and FIRST registers 106 and 108. The cue registers 94–100 represent memory locations in which tape time will be stored corresponding to the activation of corresponding cue switches 48, 50, 52 and 54. Register 102 is labeled the START register, and register 104 is labeled the END register. The purpose of these registers, as well as the TIME register 106 and the FIRST register 108, will be explained in greater detail hereinafter. The START register stores the tape time for the start of the recording. This is important for the clock display information to be discussed hereinafter. The END register stores the time in which the recorder is stopped after a recording. The TIME register is the current tape time as maintained by the microprocessor via the pulse output from the tape timer latch 62 to the interrupt line of the microprocessor 60.

Referring now more particularly to FIG. 4, the process by which the destination register selection is performed whenever a cue switch is activated is illustrated. This flow chart corresponds to a routine which is followed by the microprocessor under the control of the control memory 66.

The first step 110 of the process is to test all of the cue switches 48–56 to determine if any of them have been actuated. If any of the cue switches 48–54 have been actuated, then the process proceeds to step 112 in which a temporary memoy location labeled "LAST" is set equal to the button number (i.e. 1, 2, 3 or 4) of the switch (48, 50, 52, or 54) which was actuated. A second memory location labled "NEXT" is set equal to LAST+1. If the enter button (i.e. 5) of switch 56 has been actuated, the process proceeds to step 114 at which LAST is set equal to NEXT and NEXT is set equal to LAST+1. After either step 112 or 114, the process then proceeds to test NEXT at step 116.

The purpose of steps 110, 112 and 114 is so that the sequencing of the registers will be accomplished in synchronism with the order in which the cue switches are arranged on the control panel. Thus, if the first cue switch 48 is activated, the microprocessor will know that through LAST. It will also know that the next cue switch to be activated in order would be cue switch 50, that is, cue 2. The microprocessor, through a separate routine which is not to be described, causes a light under each one of the cue buttons to flash in accordance with the NEXT location.

On the other hand, if the enter button 56 has been actuated, NEXT will be assigned as the next cue switch in order from whatever the last cue switch that was activated. As, for example, if cue switch 48 were actuated for the first cue, the second cue could be called by either depressing cue switch 50 or by pressing the enter button 56. Either action will cause the contents of the TIME register 106 to be written into the second cue register 96. If, however, after switch 50 has been actuated and the second cue has been dropped, and it is desired to change the second cue address, it is necessary to re-press switch 50 at a different tape time in order to change the cue time. Pressing the enter button 56 will simply cause a third cue to be dropped at the third cue register 98 instead of rewriting the contents of the register 96.

At process step 116, the microprocessor 60 determines whether NEXT is less than or equal to 4. If it is, then the microprocessor 60 knows that the last cue switch to be activated was not the cue switch 54 and it then proceeds to a process sub-routine labeled Register Transfer which will be described in greater detail in respect to FIG. 5. If NEXT is greater than 4, indicating that the last cue button actuated was cue button 54, then NEXT is set equal to one at step 118 and the microprocessor 60 proceeds to the Register Transfer routine, to be described hereinafter in reference to FIG. 5. Setting NEXT equal to one simply means that the last cue switch actuated was switch number 54, corresponding to the fourth cue. Pressing the enter button once again will cause the light beneath cue switch 48 to flash, indicating that the next cue to be entered by the enter routine will correspond to the first cue.

Referring now more particularly to FIG. 5, after the destination selection has been performed by the process just described, the data corresponding to the tape time at which the cue switch or enter switch was pressed will now be stored in a selected register corresponding to that particular cue switch. The Register Transfer routine begins at step 120 in which one of the registers 94, 96, 98 or 100, as pointed to by the LAST location mentioned in the routine described in reference to FIG. 4, is set equal to the tape time. This is a Register Transfer from the register 106 into the register pointed to by the value in LAST. At the next step 122, the microprocessor tests whether there has been a first flag or not. If it is the first time that a cue switch has been actuated the first flag will be true and the register 108 within the RAM 68 will have the contents of the time register 106 copied into it. Also the first flag will be set to false and the process will be terminated. The first register 108 is not the same as the cue 1 register 94, but is a separate register for beginning the fine clock display as will be explained in greater detail hereinafter.

Referring now more particularly to FIG. 6, the method by which the tape timer which is internal to the controller is synchronized with the VTR tape timer is illustrated. The microprocessor 60, upon receiving a pulse on its interrupt line from the tape timer latch 62, first tests the tape direction via the direction bit 64 to determine whether the tape is being moved forward or in reverse. If the tape is moving forward, the microprocessor 60 increments the tape time stored in the time register 106. If the tape is moving in reverse, the register 106 is decremented accordingly. The microprocessor in either case then returns from the Interrupt routine.

When the VTR stops moving the tape it is necessary, as will be explained in greater detail hereinafter, for purposes of the clock display, to store the time at which the VTR was stopped if it is in the recording mode. In the first step 134 of the flow chart depicted in FIG. 7, when the microprocessor 60 receives a stop entry from the switch 86 it first determines whether the VTR was recording or not. If the VTR was not, then the process is terminated. If the VTR was recording, then the register 104 within the RAM 68 has the contents of the time register 106 copied into it and the process is then terminated.

In FIG. 8 the tape timer display 76 is illustrated in greater detail. The serial tape time data 16 from the VTR is supplied to the input of the shift register 138 which takes each four-bit nibble individually and, through a multiplexer 140, feeds a 16 digit memory 142 with the tape time data. The memory 142 can also be supplied with data from the microprocessor through the I/O bus 90 and a five-bit latch 144 which is connected to the memory 142 through the multiplexer 140.

The memory addresses are supplied through a second multiplexer 146, which addresses are determined either by a counter 148 or the microprocessor through a four-bit buffer 150 connected to the I/O bus 90. The microprocessor 60 can select, through a select line 152 connected between the five-bit latch 144 and the multiplexers 140 and 146 whether the memory 142 is to be supplied with tape time data 16, whose address is controlled by the VTR, or whether the memory 142 will be supplied with data from the microprocessor, whose address is also supplied by the microprocessor.

The counter 148 is supplied with serial clock data from the VTR. These data comprise a timing signal from the VTR which signifies when the data from the VTR is valid. The data contain initialization information for the counter 148 and tell the memory 142 what the position is of the digit and signal coming from the shift register 138. The counter 148 essentially counts the number of digits to supply the digit position information to the memory 142.

The microprocessor 60 can, instead of writing to the 16-digit memory 142, also read the contents of the memory as loaded from the VTR. This feature is used in initialization, for example, where the VTR may already have recorded 15 minutes worth of tape before the control unit has been turned on. In such a situation, the motion controller must be able to read the VTR current tape time in order to update its own internal tape timer correctly. In order to do this, the data output of the memory 142 is fed through a four-bit bus buffer 154 back to the I/O bus 90 of the microprocessor 60.

Referring more particularly to FIG. 9, the routine followed by the microprocessor in displaying the particular tape times as stored in the cue registers is illustrated. Whenever one of the cue buttons 48-54 is pressed during a period when the VTR is stopped, the microprocessor enters into this routine in which the first step 156 is to set a temporary data storage area labeled TEMP equal to the contents of whatever register corresponds to the cue switch 48-54 which has been actuated. The microprocessor then converts the contents of TEMP to a seven-digit number and outputs, digit by digit, this information to the tape timer display assembly 76. The process is then terminated.

In another feature of the controller of the invention, the controller will cause the VTR to stop the tape shortly before the end of the recorded segment on the tape so that unrecorded segments of the tape will not be accidentally played back. The process for accomplishing this is illustrated in FIG. 10. The microprocessor enters the Jog Mode sub-process. The first step 162 of this process is to set a temporary data storage area (TEMP) equal to the contents of the END register 104. As discussed above with reference to FIG. 7, the contents of END are the tape time in which the VTR was stopped when it was recording. In the step 164, TEMP is set equal to TEMP minus a predetermined frame constant. This predetermined frame constant is a certain number of frames so that the machine will actually stop just before the end point. This predetermined frame constant is a function of which machine is being controlled and has to do with the specifics of that VTR and its servo system.

The microprocessor 60 then determines at step 166 whether TEMP is less than or equal to the present tape time. If not, the process loops and repasses through decision 166 until tape time has exceeded TEMP, which is slightly before the time at END, and the microprocessor then proceeds to step 168, where it sends a still command to the VTR to halt tape motion.

The Jog Mode is entered by software detection of front panel activation of the variable motion joystick 28 or the N, N/2, or N/5 buttons 30.

One example of how this technique is used is when the VTR is being operated under variable speed control by the controller for broadcast. In such a situation, it would be extremely undesirable to have the tape played past the point where signals had been recorded. This would put noise on the air and would be very undesirable. The microprocessor detects whether or not the tally light is on, indicating that the VTR's output is being broadcast, and by means of the foregoing process causes the VTR to still at some point just prior to the end of the recorded segment. This presents a still picture rather than unrecorded noise on the screen.

A second example is the stunt-to-cue mode. In the stunt-to-cue mode, the end point is determined by one cue and the starting point can be determined by a second cue or even done manually. The foregoing process allows the machine to be stilled slightly before the end point determined by the first cue. For example, if the recorded tape segment is a skier going off a jump, the cue might be set just as the skier leaves the ramp. By appropriate selection of the predetermined frame constant, the VTR will be stilled automatically just as the skier is leaving the ramp.

Referring to FIG. 11, the components of the controller for commanding the VTR are illustrated. Serial VTR status data 170 from the VTR is supplied to a set of shift registers 172 to convert the data to parallel form. This data is then output through bus buffers 174 over the microprocessor I/O bus 90 to the microprocessor 60. The command output data from the microprocessor 60 over the bus 90 is supplied in parallel form to latches 176 where it is converted by shift registers 178 back into serial command data 180 to the VTR.

The initialization of the fine and coarse clock displays 22 and 24 is performed by the microprocessor in the routine illustrated in FIG. 12. As previously mentioned, the fine clock display 22 has a one second resolution per LED, and the coarse clock 24 displays time as an accumulated function, in other words, as the tape is played, each LED will light and remain lit in sequence so that the display will appear similar to a growing thermometer. The cue clock display 26 indicates where cues have been dropped and is located below the coarse clock time display. These LEDs are individually lit and are not accumulating.

To begin the initialization procedure, the microprocessor 60 sets the start register 102 equal to the contents of the tape time register 106 at step 182. At step 184, the microprocessor 60 then clears the coarse clock displays and clears the fine clock displays at step 186. The subroutine is then exited to the rest of the record mode.

In FIG. 13, the process by which the clock displays are updated using the Periodic Interrupt routine is illustrated. This is done to make the clock displays come out such that they are always relative to the start of the recording. A temporary value is subtracted from the start time and we check to see that the tape position is such that it is before the start time. If it is, the display is blank, since there is no accumulated time forward. This would happen if the tape has been rewound or gone past the beginning somehow. If this is not the case, then the time is displayed. The subroutine begins with step 188 in which the microprocessor 60 sets the TEMP register equal to the contents of the tape time register 106. At the next step, step 190, the microprocessor 60 sets TEMP equal to its previous contents minus the contents of the start register 102. Then a decision at 192 is reached in which the microprocessor 60 determines whether TEMP is less than zero, and if so, it blanks the display at step 194 or, if TEMP is not less than zero, it generates X-Y LED matrix drive commands. At step 198, the microprocessor 60 sends X-Y matrix commands to the coarse clock LED latches 74 and ends the procedure. The X-Y matrix drive command set is a mathematical X-Y selection, i.e., a simple calculation that has to do with the number of seconds moved and mathematical functions which are not important to the discussion of this operation.

Referring now to FIG. 14, the same process is followed for updating the fine clock 22. This is the same routine as used in the updating of the coarse clock and thus the same reference numerals have been applied to the various steps. The only difference is that instead of sensing the X-Y matrix commands to the coarse clock LED latches at step 198, the commands are sent to the fine clock LED latches at a step 200. The procedure is then exited.

Referring now more particularly to FIG. 15, a block diagram is shown of that portion of the controller which drives the X and Y eight-bit latches for the clock displays. The microprocessor 60 drives an X latch 202 and a Y latch 204 through the I/O bus 90 to operate the fine clock X-Y LED array 22. Similarly, the miroprocessor 60, through the I/O bus 90, operates an X latch 206 and a Y latch 208 for the coarse clock X-Y LED array 24. Together, the latches 202-208 make up the latch unit 74 referred to previously.

The controller is capable of directing the VTR to position the tape in accordance with the tape time stored in a selected one of the cue registers. The search routine followed by the microprocessor 60 in issuing the VTR commands is illustrated in FIG. 16 and FIG. 17. In FIG. 16, the Search mode begins with step 210 in which the microprocessor 60 loads a temporary register labeled TEMP with the contents of one of the registers 94 to 100, corresponding to the last entered cue point. The microprocessor 60 then determines at step 212 if any one of the cue switches 48 through 54 is being pressed. If the answer is yes, then at step 214 the miroprocessor 60 loads the contents of the register 94-100 corresponding to the cue switch 48-54 which is being pressed into the temporary register. If no cue button is being pressed, then the microprocessor 60 proceeds to step 216 and determines whether or not the preroll button 45 has been actuated. If the answer is yes, then the temporary storage register is decremented by the count shown on the preroll thumbwheels 46. The microprocessor 60 then begins the Trajectory Approach and Park subroutine 220. The value now in the temporary register represents the point at which the tape should be positioned at the end of the search sequence.

Referring to FIG. 17, in the Trajectory Approach and Park subroutine 220, the microprocessor 60 first determines the direction in which the tape must move at decision step 222 by asking the question whether the contents of TEMP are greater than the current tape time, i.e, the tape position. If the answer is yes, then a direction flag is set equal to forward. If the answer is no, then the direction flag is set equal to reverse. The microprocessor 60 then takes the absolute difference between TEMP and tape position and determines whether this is greater than 255 seconds. If the answer is yes, then the microprocessor 60 proceeds to step 230 in which the VTR is given a speed command of full speed, i.e., fast forward.

If the difference between temporary and the tape position is less than five seconds, as determined in step 232, the microprocessor issues a speed command at 234 to the VTR to proceed at normal speed. In between these two extremes, the velocity of the VTR is compared against an internally generated range of velocities, the desired velocities being a function of the distance to the cue point. This is done at step 236. The velocity in this range is regulated at step 238 by switching between the full speed command 230 and the normal speed command 234. Full speed is selected when the actual tape velocity falls below the desired velocity and the normal speed is selected when the actual tape velocity is above the desired velocity.

At step 240 the microprocessor 60 determines if the tape position is within the parking tolerance, i.e., a few video frames of the desired cue position. If it is not, then at step 242, the microprocessor 60 sends appropriate direction and speed commands to the VTR and returns to step 228 of the process. If the tape position is within the parking tolerance, the VTR is commanded to stop at step 244 and the subroutine is exited.

The terms and expressions which have been employed herein are used as terms of description and not of limitation, and there is no intention, in the use of such terms and expressions of excluding equivalents of the features shown and described, or portions thereof, it being recognized that various modifications are possible within the scope of the invention as claimed.

What is claimed is:

1. Cue control apparatus for use in combination with a video tape recorder (VTR) of the type having a recording tape, means for recording signals on said tape and for reproducing output signals from said tape, tape drive means, and means for producing tape time signals corresponding to movement of said tape through a predetermined distance; the tape cue apparatus being electrically connected to said VTR and comprising
    a tape time counter for counting said tape time signals and for producing corresponding count output signals;
    a plurality of cue switch means;
    a plurality of cue registers for storing count output signals supplied thereto, each of said cue registers having a separate one of said cue switch means assigned to it;
    means for supplying said count output signals of said tape time counter to each cue register as its assigned cue switch means is actuated during movement of said tape; and
    means for controlling said tape drive means in accordance with the count output signal stored in a selected one of said registers.

2. The combination as recited in claim 1 wherein the means for controlling said tape drive means do so in accordance with the count output signals stored in two of said cue registers.

3. The combination as recited in claim 1 further comprising
    second switch means;
    means for selecting each of said cue registers consecutively and circularly and for supplying said count output signal thereto whenever said second switch means are actuated during the movement of said tape.

4. The combination as recited in claim 1 further comprising
    an END register for storing count output signals supplied thereto, and
    means for supplying the count output signal to said END register whenever said VTR stops recording.

5. The combination as recited in claim 4 further comprising
    means supplied with the count output signal for generating and storing a stop tape time signal, said stop tape time being earlier than the count output signal stored in said END register by an amount representative of a predetermined number of video frames; and
    means for comparing the count output signal with said stop tape time signal and for stopping said tape during reproduction of the output signal recorded on said tape when the counter output signal equals said stop tape time signal.

6. The combination as recited in claim 1 further comprising display means for indicating tape time,
    means for supplying to said display means the count output signal during motion of said tape and for supplying the count output signal stored in a selected one of said cue registers to said display means when said tape is stopped.

7. The combination as recited in claim 1 comprising record switch means for starting the recording function of said VTR;

stop switch means for stopping said recording function;
coarse clock display means;
fine clock display means;
means for starting said coarse clock display means when said record switch means are actuated;
means for starting said fine clock display means when an output signal of said tape time counter is supplied to any one of said cue registers; and
means for stopping said coarse clock display means and said fine clock display means when said stop switch means are actuated.

8. A method of controlling a video tape recorder (VTR) of the type which records and reproduces signals on a recording tape and which produces tape time signals representative of the movement of the tape through the VTR, the control method comprising the steps of counting the tape time signals and producing corresponding count output signals;
separately selecting and storing a plurality of selected count output signals while the tape is in motion; and
controlling the VTR to position the tape in accordance with at least one of the selected and stored count output signals.

9. The control method as recited in claim 8 wherein the step of separately storing the selected count output signals proceeds in a fixed, circular sequence.

10. The control method as recited in claim 8 wherein the storing step includes the step of producing and storing a stop tape time signal which is a selected number of video frames prior in time to one of the selected and stored count output signals and wherein the controlling step includes the step of stopping the tape when the count output signal equals the stop tape time.

* * * * *